United States Patent
Tujkovic et al.

(10) Patent No.: US 10,356,826 B2
(45) Date of Patent: Jul. 16, 2019

(54) SIMULTANEOUS BIDIRECTIONAL WIRELESS LINK

(71) Applicant: Facebook, Inc., Menlo Park, CA (US)

(72) Inventors: Djordje Tujkovic, Mountain View, CA (US); Krishna Gomadam, San Jose, CA (US); Sanjai Kohli, Manhattan Beach, CA (US)

(73) Assignee: Facebook, Inc., Menlo Park, CA (US)

( * ) Notice: Subject to any disclaimer, the term of this patent is extended or adjusted under 35 U.S.C. 154(b) by 188 days.

(21) Appl. No.: 15/196,340

(22) Filed: Jun. 29, 2016

(65) Prior Publication Data
US 2018/0007718 A1 Jan. 4, 2018

(51) Int. Cl.
*H04B 7/06* (2006.01)
*H04W 76/10* (2018.01)

(52) U.S. Cl.
CPC .......... *H04W 76/10* (2018.02); *H04B 7/0617* (2013.01)

(58) Field of Classification Search
CPC . H04W 76/02; H04W 72/0446; H04B 7/0617
See application file for complete search history.

(56) References Cited

U.S. PATENT DOCUMENTS

| | | | |
|---|---|---|---|
| 6,826,148 B1 | 11/2004 | Lee | |
| 8,737,361 B2 | 5/2014 | Park et al. | |
| 9,215,644 B2 | 12/2015 | Kohli | |
| 9,277,480 B2 | 3/2016 | Kohli | |
| 2002/0122465 A1* | 9/2002 | Agee | H04B 1/69 375/141 |
| 2004/0146043 A1 | 7/2004 | Hiraoka et al. | |
| 2005/0135322 A1 | 6/2005 | Lim et al. | |
| 2005/0277444 A1* | 12/2005 | Rensburg | H04W 72/1273 455/562.1 |
| 2005/0283643 A1 | 12/2005 | Banerjee et al. | |
| 2006/0114818 A1 | 6/2006 | Canali et al. | |
| 2006/0146696 A1 | 7/2006 | Li et al. | |
| 2007/0041347 A1* | 2/2007 | Beale | H04W 48/10 370/335 |
| 2007/0230639 A1 | 10/2007 | Stirling-Gallacher | |

(Continued)

OTHER PUBLICATIONS

U.S. Appl. No. 15/196,414, Kohli et al, Titled "Hybrid Node", filed Jun. 29, 2016, Notice of Allowance.

(Continued)

*Primary Examiner* — Walter J DiVito
(74) *Attorney, Agent, or Firm* — Brian R. Short

(57) ABSTRACT

Apparatuses, methods, and systems of a node that supports a simultaneous bidirectional wireless link with a second node are disclosed. One embodiment of the node includes a first sector that includes a first transceiver and a first plurality of antennas operative to form a beam directed to a first sector of a second node. The node further includes a second sector that includes a second transceiver and a second plurality of antennas operative to form a beam directed to a second sector of the second node. For at least one time slot of a plurality of time slots, one of the first transceiver or the second transceiver is operative to transmit a first communication signal to the second node while the other of the first transceiver or the second transceiver is operative to receive a second communication signal from the second node.

20 Claims, 9 Drawing Sheets

(56) References Cited

U.S. PATENT DOCUMENTS

| | | |
|---|---|---|
| 2008/0069034 A1 | 3/2008 | Buddhikot et al. |
| 2008/0090575 A1 | 4/2008 | Barak et al. |
| 2008/0248802 A1 | 10/2008 | Krishnamoorthy et al. |
| 2010/0080119 A1 | 4/2010 | Ansorge |
| 2010/0177664 A1 | 7/2010 | Thoumy et al. |
| 2011/0038253 A1 | 2/2011 | Yabusaki et al. |
| 2011/0045767 A1 | 2/2011 | Rofougaran et al. |
| 2011/0103503 A1 | 5/2011 | Shin et al. |
| 2011/0159821 A1 | 6/2011 | Park et al. |
| 2011/0223964 A1 | 9/2011 | Ebiko |
| 2012/0011365 A1 | 1/2012 | Schmidt et al. |
| 2012/0063447 A1 | 3/2012 | Tyrrell et al. |
| 2013/0044650 A1* | 2/2013 | Barker ............... H04B 7/0617 370/278 |
| 2013/0089042 A1 | 4/2013 | Negus et al. |
| 2013/0128726 A1 | 5/2013 | Hellhake et al. |
| 2013/0176874 A1 | 7/2013 | Xu et al. |
| 2013/0201857 A1 | 8/2013 | Bhargava et al. |
| 2013/0301619 A1 | 11/2013 | Singh et al. |
| 2014/0074392 A1 | 3/2014 | Holm et al. |
| 2014/0086080 A1 | 3/2014 | Hui et al. |
| 2014/0204902 A1 | 7/2014 | Maltsev et al. |
| 2014/0286156 A1 | 9/2014 | Kohli et al. |
| 2014/0286251 A1 | 9/2014 | Kohli et al. |
| 2015/0092621 A1 | 4/2015 | Jalloul et al. |
| 2015/0094025 A1 | 4/2015 | Chen |
| 2015/0280887 A1 | 10/2015 | Ko et al. |
| 2015/0373572 A1 | 12/2015 | Sahin et al. |
| 2016/0021597 A1 | 1/2016 | Hart et al. |
| 2016/0028610 A1 | 2/2016 | Kohli et al. |
| 2016/0036500 A1 | 2/2016 | Kohli et al. |
| 2016/0037431 A1 | 2/2016 | Kohli et al. |
| 2016/0100415 A1 | 4/2016 | Mishra et al. |
| 2016/0105211 A1 | 4/2016 | Kim et al. |
| 2016/0127101 A1 | 5/2016 | Hanson et al. |
| 2016/0352396 A1 | 12/2016 | Seol et al. |
| 2017/0079031 A1* | 3/2017 | Maltsev, Jr. ...... H04W 72/0446 |
| 2017/0288769 A1* | 10/2017 | Miller .................. H04B 7/212 |
| 2017/0295595 A1* | 10/2017 | Yang ................ H04W 74/0816 |

OTHER PUBLICATIONS

U.S. Appl. No. 15/196,414, Kohli et al, Titled "Hybrid Node", filed Jun. 29, 2016, Specification.

U.S. Appl. No. 15/196,414, Kohli et al, Titled "Hybrid Node", filed Jun. 29, 2016, Figures.

* cited by examiner

| Sector 1 Beam Setting | Sector 2 Beam Setting | Received Signal Quality At T1 | Received Signal Quality At T2 | Received Signal Quality At T3 |
|---|---|---|---|---|
| 1 | 1 | A | Z | Y |
| 1 | 2 | B | B | B |
| 1 | ... | | | |
| 1 | N | D | D | D |
| 2 | 1 | E | Y | Y |
| 2 | 2 | F | F | F |
| 2 | ... | | | |
| 2 | N | G | H | F |
| ... | ... | | | |
| M | 1 | No Value (Avoided) | No Value (Avoided) | No Value (Avoided) |
| M | 2 | No Value (Avoided) | No Value (Avoided) | No Value (Avoided) |
| M | ... | | | |
| M | N | No Value (Avoided) | No Value (Avoided) | No Value (Avoided) |

FIGURE 8

SIMULTANEOUS BIDIRECTIONAL WIRELESS LINK

FIELD OF THE DESCRIBED EMBODIMENTS

The described embodiments relate generally to wireless communications. More particularly, the described embodiments relate to systems, methods and apparatuses of a simultaneous bidirectional wireless link.

BACKGROUND

Transmission and reception of communication between a node and another node on a common channel of a wireless network are typically time division duplexed to reduce interference between transmitted are receive communication signals.

It is desirable to have methods apparatuses, and systems for a simultaneous bidirectional (transmission and reception) wireless link.

SUMMARY

An embodiment includes a node. The node includes a first sector that includes a first transceiver and a first plurality of antennas, wherein the first plurality of antennas is operative to form a beam directed to a first sector of a second node. The node further includes a second sector that includes a second transceiver and a second plurality of antennas, wherein the second plurality of antennas is operative to form a beam directed to a second sector of the second node. For at least one time slot of a plurality of time slots, one of the first transceiver or the second transceiver is operative to transmit a first communication signal to the second node while the other of the first transceiver or the second transceiver is operative to receive a second communication signal from the second node.

Another embodiment includes a method of a node. The method includes forming a first beam directed to a first sector of a second node by a first plurality of antennas of a first sector of a first transceiver of a node, forming a second beam directed to a second sector of a second node by a second plurality of antennas of a second sector of a second transceiver of the node, and transmitting, by one of the first transceiver or the second transceiver, a first communication signal to the second node while the other of the first transceiver or the second transceiver is receiving a second communication signal from the second node for at least one time slot of a plurality of time slots.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 8 shows a table of an example node that includes sector beam forming settings, and received signal qualities, according to an embodiment.

DETAILED DESCRIPTION

The embodiments described include methods, apparatuses, and systems of a simultaneous bidirectional wireless link formed between a node and a second node over a common transmission channel. That is, for at least some embodiments, the simultaneous bidirectional wireless link is formed between the node and the second node by one of a first transceiver of the node or a second transceiver of the node transmitting a first communication signal to the second node over a transmission channel while the other of the first transceiver or the second transceiver is receiving a second communication signal from the second node over the transmission channel. At least some embodiments include selecting between the simultaneous bidirectional wireless link between the node and the second node, and a non-simultaneous bidirectional link between the node and the second node. Alternatively or additionally, at least some embodiments include selecting between the simultaneous bidirectional wireless link between the node and a second node, and between the node and another node.

Figure 1:
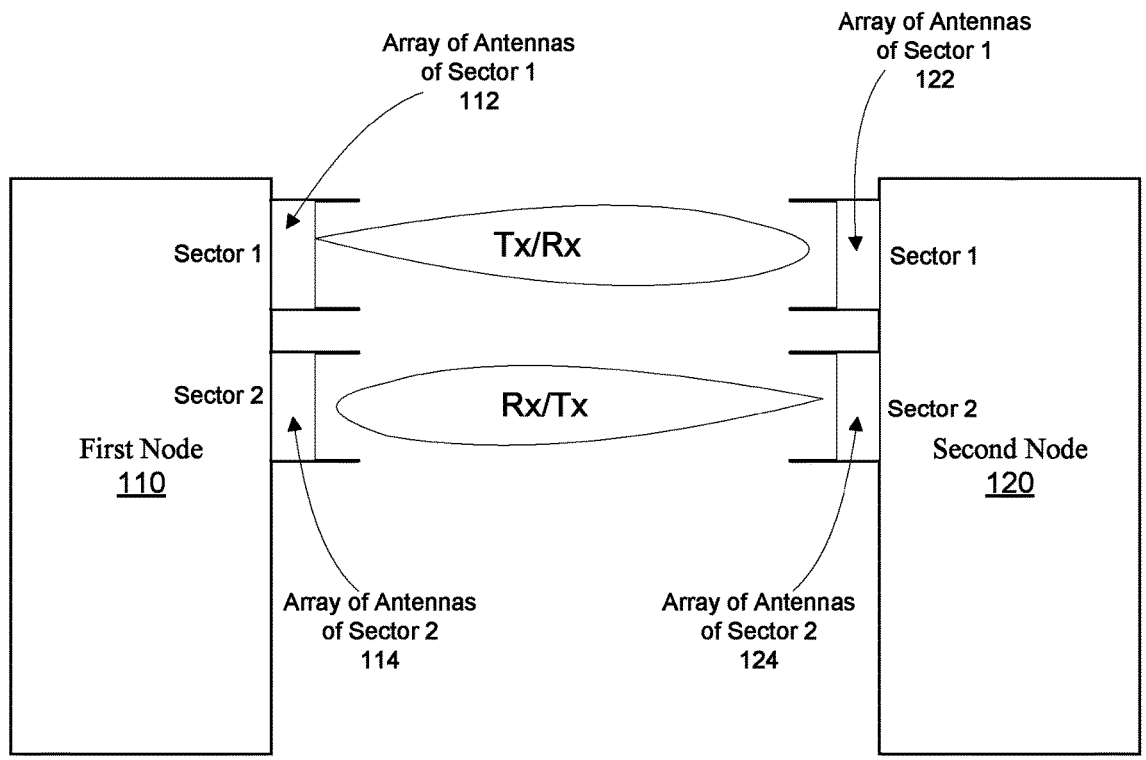
FIG. 1 shows a simultaneous bidirectional wireless link formed between a first node and a second node, according to an embodiment.

FIG. 1 shows a simultaneous bidirectional wireless link formed between a first node 110 and a second node 120, according to an embodiment. As shown, the first node 110 includes at least a first sector (sector 1) and a second sector (sector 2). For an embodiment, the first sector includes a plurality or array of antennas 112 and the second sector includes a plurality or array of antennas 114 which are each operative to form beams. For an embodiment, the first sector of the first node 110 includes a first transceiver and a first plurality of antennas 112. For an embodiment, the first plurality of antennas 112 is operative to form a beam directed to a first sector of the second node 120. As will be described later, it should be noted that multiple beam forming settings of the first plurality of antennas 112 of the first sector may be used to direct the beam to the first sector of the second node 120. That is, a first setting may include a line-of-sight path while another setting may include an indirect reflective path that is redirected by a reflector.

Further, for an embodiment, the second sector of the first node 110 includes a second transceiver and a second plurality of antennas 114. For an embodiment, the second plurality of antennas 114 is operative to form a beam directed to a second sector of the second node 120. As will be described later, it should be noted that multiple beam forming settings may be used to direct the beam of the second plurality of antennas 114 to the second sector of the second node 120. That is, a first setting may include a line-of-sight path while another setting may include an indirect reflective path that is redirected by a reflector.

For at least some embodiments, the first sector of the second node 120 include a transceiver and a plurality of antennas 122 and the second sector of the second node 120 includes a transceiver and a plurality of antennas 124. For an embodiment, the plurality of antennas 122 of the first sector of the second node 120 and the plurality of antennas 124 of the second sector of the second node 120 form beams that are directed to the first sector and second sector of the first node 110.

For at least some embodiments, transmission and reception of communication signals of the first sector of the first node 110 and transmission and reception of communication signals of the second sector of the second node 120 are scheduled over the same transmission channel. For at least some embodiments, the transmission channel is defined in part by a set of frequencies through which electromagnetic signals modulated by information propagate between the first node 110 and the second node 120. For an embodiment, the transmission channel is used to propagate an information signal, for example a digital bit stream, from one or several senders (or transmitters) to one or several receivers. A transmission channel has a certain capacity for transmitting information, often measured by its bandwidth in Hz or its data rate in bits per second.

For an embodiment, the scheduling of the transmission and reception of communication of the first sector and the second sector of the first node 110 is performed external to the first node 110. For an embodiment, the scheduling of the transmission and reception of communication of the first sector and the second sector of the first node 110 is performed internal to the first node 110. For an embodiment, the scheduling of the transmission and reception of communication of the first sector and the second sector of the first node 110 is performed both internal and external to the first node 110. For an embodiment, the scheduling of the transmission and reception of communication of the first sector and the second sector of the first node 110 is performed by a central controller.

For an embodiment, the scheduling includes a plurality of scheduled time slots. For an embodiment, for at least one time slot of the plurality of scheduled time slots, one of the first transceiver of the first node 110 or the second transceiver of the first node 110 transmits a first communication signal to the second node while the other of the first transceiver of the first node 110 or the second transceiver of the first node 110 receives a second communication signal from the second node. For an embodiment, the transmission and reception of communication signals of the first sector of the first node 110 are synchronized with the transmission and reception of communication signals of the second sector of the first node 110. For example, when the first sector of the first node 110 is transmitting a communication signal to the first sector of the second node 120, the second sector of the first node 110 is simultaneously and synchronously receiving a communication signal from the second sector of the second node 120 over the same transmission channel. Further, for example, when the first sector of the first node 110 is receiving a communication signal to the first sector of the second node 120, the second sector of the first node 110 is simultaneously and synchronously transmitting a communication signal from the second sector of the second node 120 over the same transmission channel.

Due to the formation of the beam by the plurality of antennas of the first sector of the first node 110, and the formation of the beam by the plurality of antennas of the second sector of the first node 110, the simultaneous communication of the first sector of the first node 110 and the second sector of the first node 110 is achieved with a tolerable amount of cross interference between the communication of the first sector of the first node 110 and the second sector of the first node 110.

For at least some embodiments, the cross interference between the first sector of the first node 110 and the second sector of the first node 110 is further reduced by further isolating the plurality of antennas of the first sector of the first node 110 from the plurality of antennas of the second sector of the first node 110. The isolation can be achieved through physical placement of the antennas and through physical shielding between the antennas.

For an embodiment, the plurality of antennas of the first sector of the first node 110 are isolated from the plurality of antennas of the second sector of the first node 110 by physically locating the plurality of antennas of the first sector of the first node 110 away from the plurality of antennas of the second sector of the first node 110. Further, for an embodiment, RF (radio frequency) shielding is included between the first sector and the second sector to improve the isolation between the first section and the second sector.

For at least some embodiments, cross interference between the communication of the first sector of the first node 110 and the second sector of the first node 110 is mitigated by one or more interference cancellation signals. That is, at least a portion of a transmission signal of a one of the first sector or the second sector is processed and intentionally couple back to one of the other of the first sector or the second sector to at least partially cancel the cross interference. For at least some embodiments, the one or more interference cancellation signals are controlled based on received signal power measurements of a self-calibration by the node (first node 110) of cross coupling (interference) between the first sector and the second sector.

Figure 2:
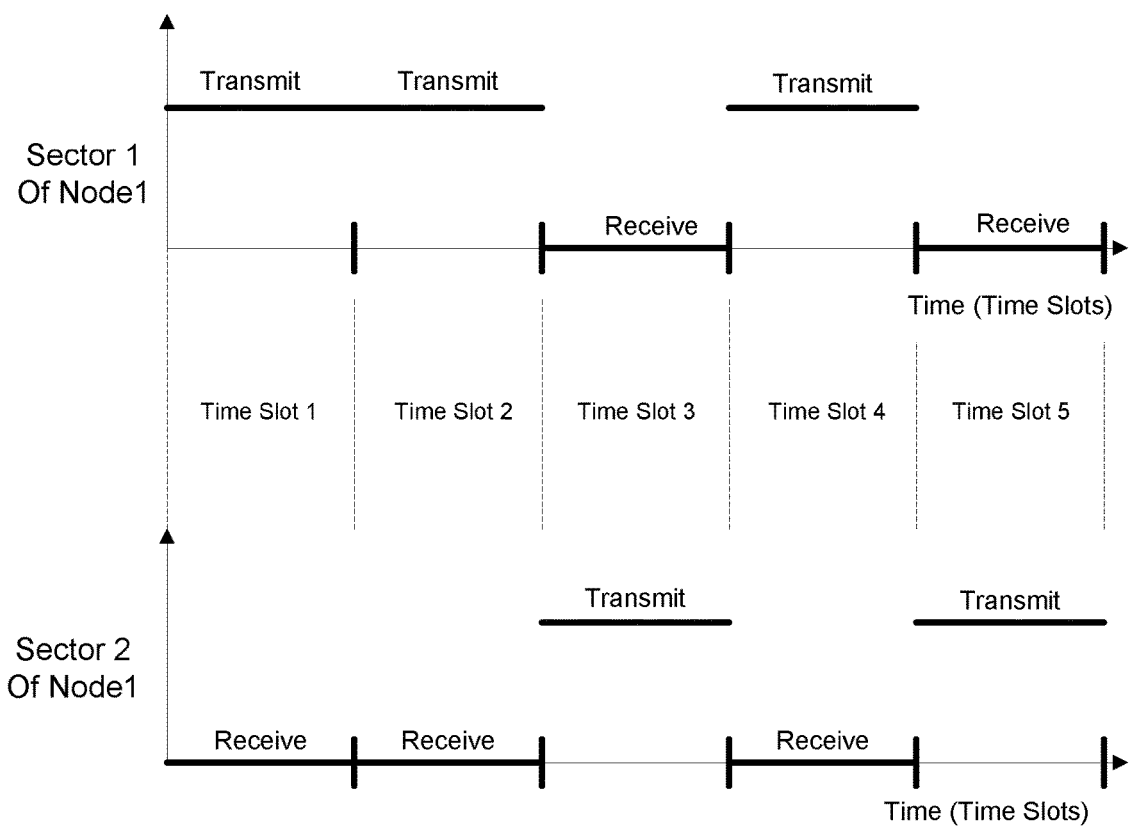
FIG. 2 shows a time line of a schedule of transmission and reception of communication signals of a first sector and a second sector of a node for supporting a simultaneous bidirectional wireless link, according to an embodiment.

FIG. 2 shows a time line of a schedule of transmission and reception of communication signals of a first sector and a second sector of a node for supporting a simultaneous bidirectional wireless link, according to an embodiment. That is, FIG. 2 shows a time line of time slots in which the first sector of the first node 110 and the second sector of the first node 110 simultaneously transmit communication signals to the second node 120, and receive communication signals from the second node 120, according to an embodiment.

As shown, for at least one time slot of the plurality of time slots, the first transceiver transmits a communication signal to the second node while the second transceiver receives a communication signal from the second node over a transmission channel, and for at least one other time slot of the plurality of time slots the first transceiver receives a communication signal from the second node 120 while the second transceiver transmits a communication signal to the second node 120 over the transmission channel. That is, for example, for a time slot 1, the first sector of the first node 110 transmits a communication signal to the second node 120 over the transmission channel while the second sector of the first node 110 receives a communication signal from the second node 120 over the transmission channel. For a time slot 2, the first sector of the first node 110 again transmits a communication signal to the second node 120 over the transmission channel while the second sector of the first node 110 receives a communication signal from the second node 120 over the transmission channel. For a time slot 3, the first sector of the first node 110 receives a communication signal from the second node 120 over the transmission channel while the second sector of the first node 110 transmits a communication signal from the second node 120 over the transmission channel. For a time slot 4, the first sector of the first node 110 again transmits a communication signal to the second node 120 over the transmission channel while the second sector of the first node 110 receives a communication signal from the second node 120 over the transmission channel. For a time slot 3, the first sector of the first node 110 again receives a communication signal from the second node 120 over the transmission channel while the second sector of the first node 110 transmits a communication signal from the second node 120 over the transmission channel.

As shown in FIG. 2, for an embodiment, scheduling of the transmission of the first communication signal is synchronized with scheduling of the reception of the second communication signal. That is, the transmission and reception of communication signals of the first and second sector of the first node 110 are time synchronized to form the simultaneous bidirectional wireless link between the first node 110 and the second node 120.

Figure 3:
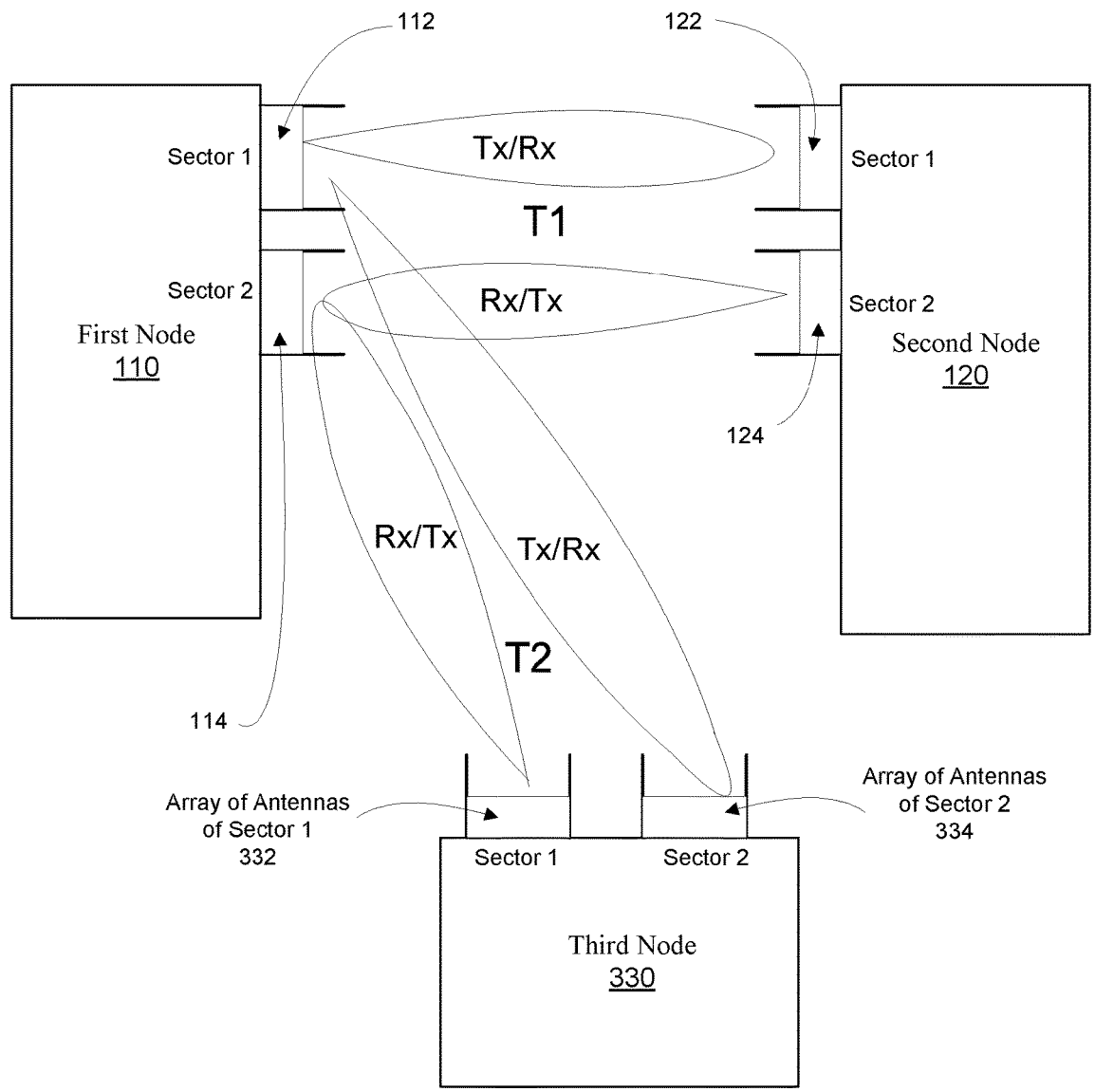
FIG. 3 shows a simultaneous bidirectional wireless link formed between a first node and a second node, and a simultaneous bidirectional wireless link formed between the first node and a third node, according to an embodiment.

FIG. 3 shows a simultaneous bidirectional wireless link formed between a first node and a second node, and a simultaneous bidirectional wireless link formed between the first node and a third node, according to an embodiment. As shown, for a first period of time T1, the first node 110 forms the simultaneous bidirectional wireless link between the first node 110 and the second node 120 as described. However, for a second period of time T2, the first node 110 forms a wireless link between the first node 110 and the third node 330. For an embodiment, the wireless link between the first node 110 and the third node 330 includes a simultaneous bidirectional wireless link. For an embodiment, the wireless link between the first node 110 and the third node 330 does not include a simultaneous bidirectional wireless link. For an embodiment, the third node 330 includes a first sector that includes a transceiver and a plurality or array of antennas 332, and a second sector that includes a transceiver and a plurality or array of antennas 334, which are operative to form beams.

The scheduling of the communication between the first node 110 and the second node 120, and the first node 110 and the third node 330 determines when the simultaneous bidirectional wireless link is formed between a first node and a second node, and when the wireless link is formed between the first node and a third node. Generally, this scheduling is based on a throughput load of each of the first node 110, the second node 120, and the third node 330. Generally, the throughput load defines how many units of information each of the first node 110, the second node 120, and the third node 330 can process in a given amount of time.

Figure 4:
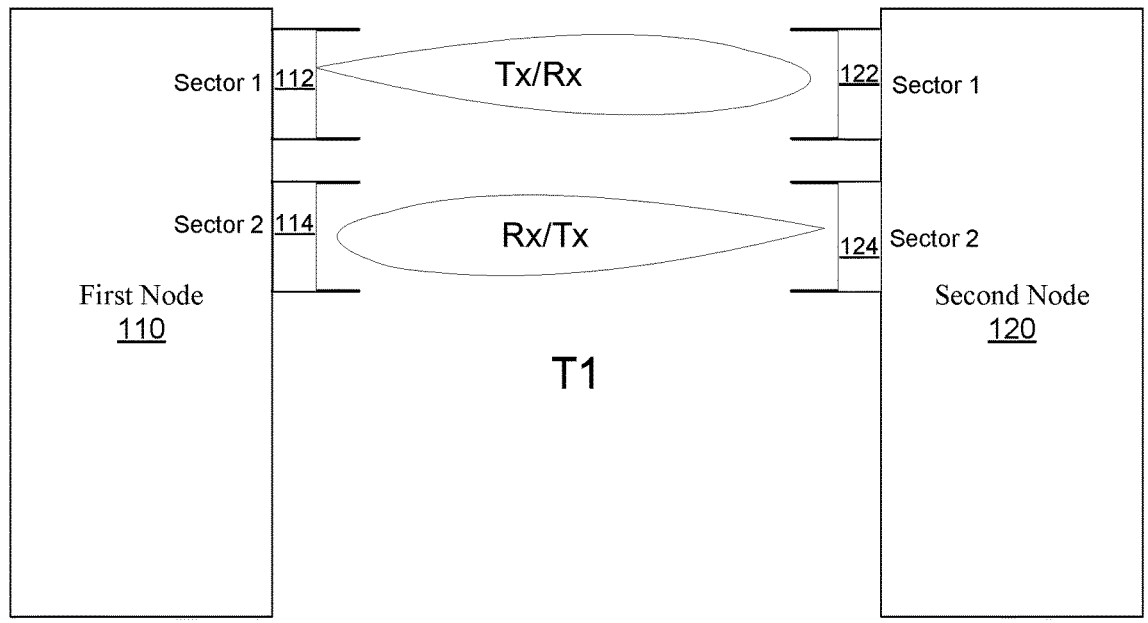
FIG. 4 shows a simultaneous bidirectional wireless link formed between a first node and a second node for a first period of time, and a wireless link formed between the first node and the second node for a second period of time, according to an embodiment.
Figure 4:
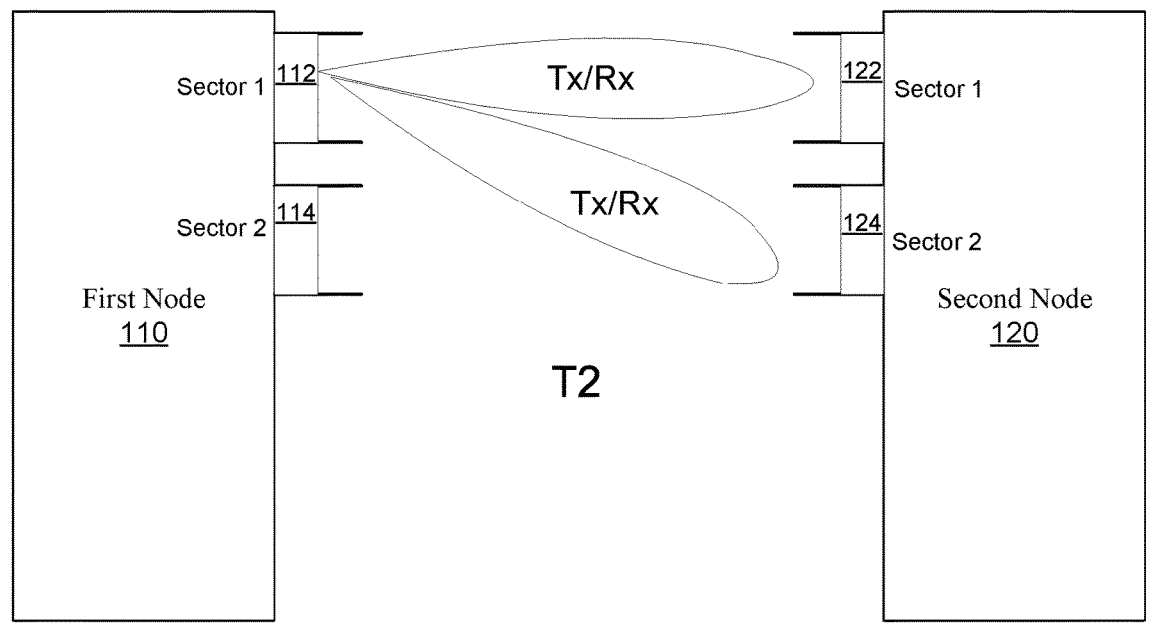

FIG. 4 shows a simultaneous bidirectional wireless link formed between a first node and a second node for a first time period (T1), and a wireless link formed between the first node and the second node for a second time period (T2), according to an embodiment. For an embodiment, the wireless link during the second time period (T2) is not a simultaneous bidirectional wireless link. An embodiment includes the selection of either the simultaneous bidirectional wireless link of the first time period (T1) or the non-simultaneous bidirectional wireless link of the second time period (T2).

Specifically, for an embodiment, the first node 110 node is operative to select between the simultaneous bidirectional wireless link between first node 110 and the second node 120 or the non-simultaneous bidirectional wireless link between the first node 110 and the second node 120. For this embodiment, the first node 110 is operative to form the simultaneous bidirectional wireless link between the first node 110 and the second node 120 for the first period of time, and the node is operative to form the non-simultaneous bidirectional wireless link between the first node 110 and the second node 120 for the second period of time.

For an embodiment, the first node 110 being operative to select between the forming simultaneous bidirectional wireless link between the first node 110 and the second node 120 or forming the non-simultaneous wireless link between the first node 110 and the second node 120 includes determining a throughput load of the first node or the second node.

An embodiment includes forming the simultaneous bidirectional wireless link between the first node 110 and the second node 120 if the throughput load is greater than a threshold, and forming the non-simultaneous bidirectional wireless link between the first node 110 and the second node 120 if the throughput is less than a threshold. For an embodiment, formation of the non-simultaneous bidirectional wireless link includes one or more of the first transceiver and the second transceiver forming one or more directional beams and transmitting the communication directed to one or more receivers of the second node.

For at least some embodiments, the formation of the non-simultaneous bidirectional link includes transmission diversity in which multiple beams are formed by the first node 110 and directed during transmission to multiple sectors of second node 120. For at least some embodiments, the formation of the non-simultaneous bidirectional link includes transmission diversity in which a single beam is formed by the first node 110 and directed during transmission to multiple sectors of second node 120. For at least some embodiments, the formation of the non-simultaneous bidirectional link includes reception diversity in which multiple beams are formed by the second node 110 and directed during reception to single sectors of second node 120. For at least some embodiments, the formation of the non-simultaneous bidirectional link includes reception diversity in which a single beam is formed by the second node 120 and directed during reception to multiple sectors of first node 110.

An embodiment includes forming the simultaneous bidirectional wireless link between the first node 110 and the second node 120 if a link quality between the first node 110 and the second node 120 is greater than a threshold, and forming the non-simultaneous bidirectional wireless link between the first node 110 and the second node 120 if the link quality between the first node 110 and the second node 120 is less than a threshold. That is, for an embodiment, the first node 110 operative to select between the simultaneous bidirectional wireless link or the non-simultaneous bidirectional wireless link between the node and the second node includes determining a link quality between the first node and the second node, and forming the simultaneous bidirectional wireless link if the link quality is greater than a threshold, and forming the non-simultaneous bidirectional wireless link between if the link quality is less than the threshold.

As previously stated, for an embodiment, formation of the non-simultaneous wireless link includes one or more of the first transceiver and the second transceiver forming one or more directional beams and transmitting the communication directed to one or more receivers of the second node. For at least some embodiments, the formation of the non-simultaneous bidirectional link includes transmission diversity in which multiple beams are formed by the first node 110 and directed during transmission to multiple sectors of second node 120. For at least some embodiments, the formation of the non-simultaneous bidirectional link includes transmission diversity in which a single beam is formed by the first node 110 and directed during transmission to multiple sectors of second node 120. For at least some embodiments, the formation of the non-simultaneous bidirectional link includes reception diversity in which multiple beams are formed by the second node 110 and directed during reception to single sectors of second node 120. For at least some embodiments, the formation of the non-simultaneous bidirectional link includes reception diversity in which a single beam is formed by the second node 120 and directed during reception to multiple sectors of first node 110.

Figure 5:
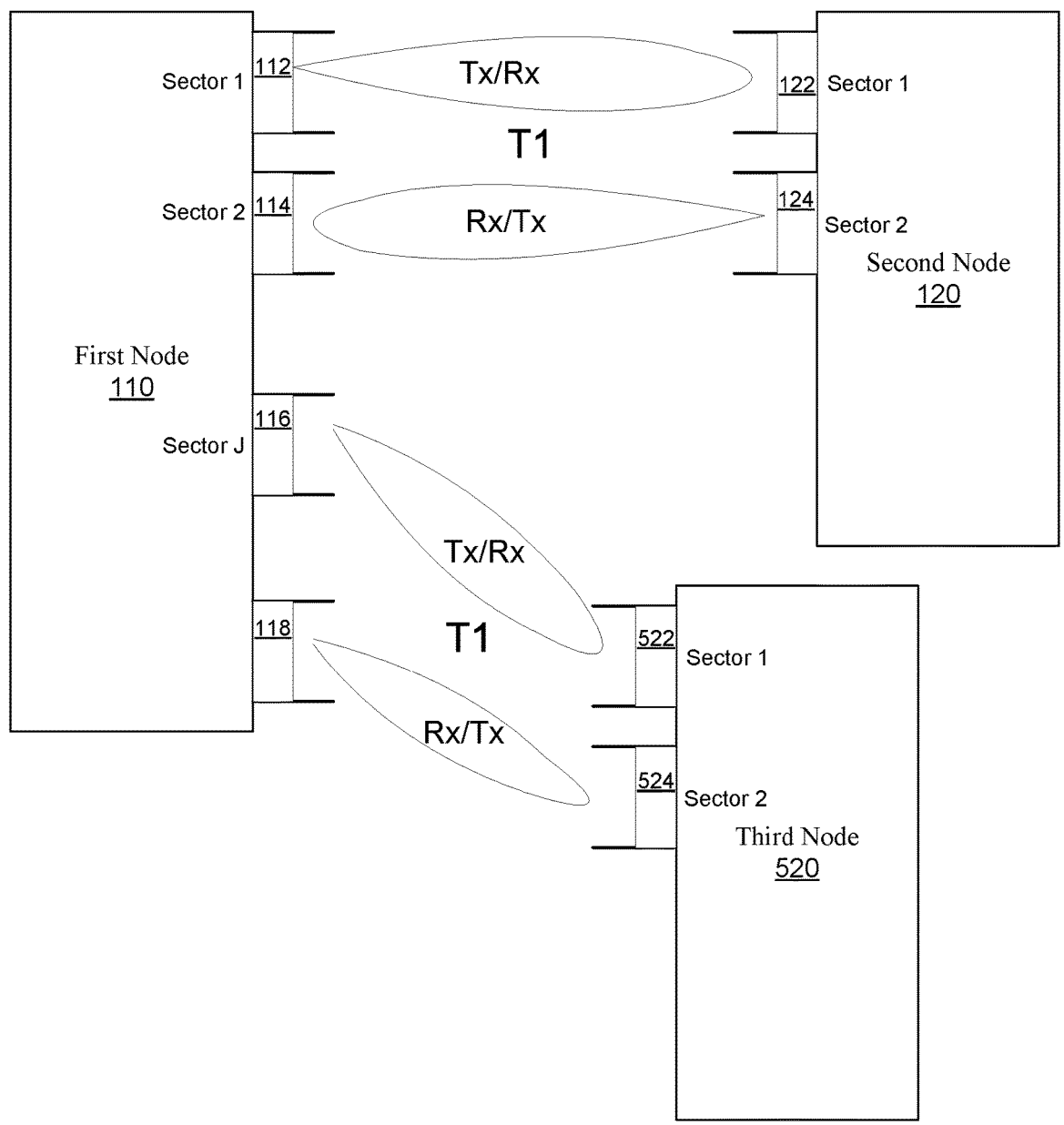
FIG. 5 shows a simultaneous bidirectional wireless link formed between a first node and a second node, and a simultaneous bidirectional wireless link formed between the first node and a third node, according to another embodiment.

FIG. 5 shows a simultaneous bidirectional wireless link formed between a first node 110 and a second node 120, and a simultaneous bidirectional wireless link formed between the first node 110 and a third node 520, according to another embodiment. This embodiment varies from the embodiments of FIG. 3 in that different sectors (sector 1 and sector 2) of the first node 110 are utilized to form the simultaneous bidirectional wireless link between a first node 110 and a second node 120 than the sectors (sector J and sector K) utilized to form the simultaneous bidirectional wireless link between a first node 110 and a third node 520. Further, the simultaneous bidirectional wireless link between a first node 110 and a second node 120 and the simultaneous bidirectional wireless link between a first node 110 and a third node 520 can be formed at the same time. For an embodiment, the third node 520 includes a first sector that includes a transceiver and a plurality or array of antennas 522, and a second sector that includes a transceiver and a plurality or array of antennas 524, which are operative to form beams.

Figure 6:
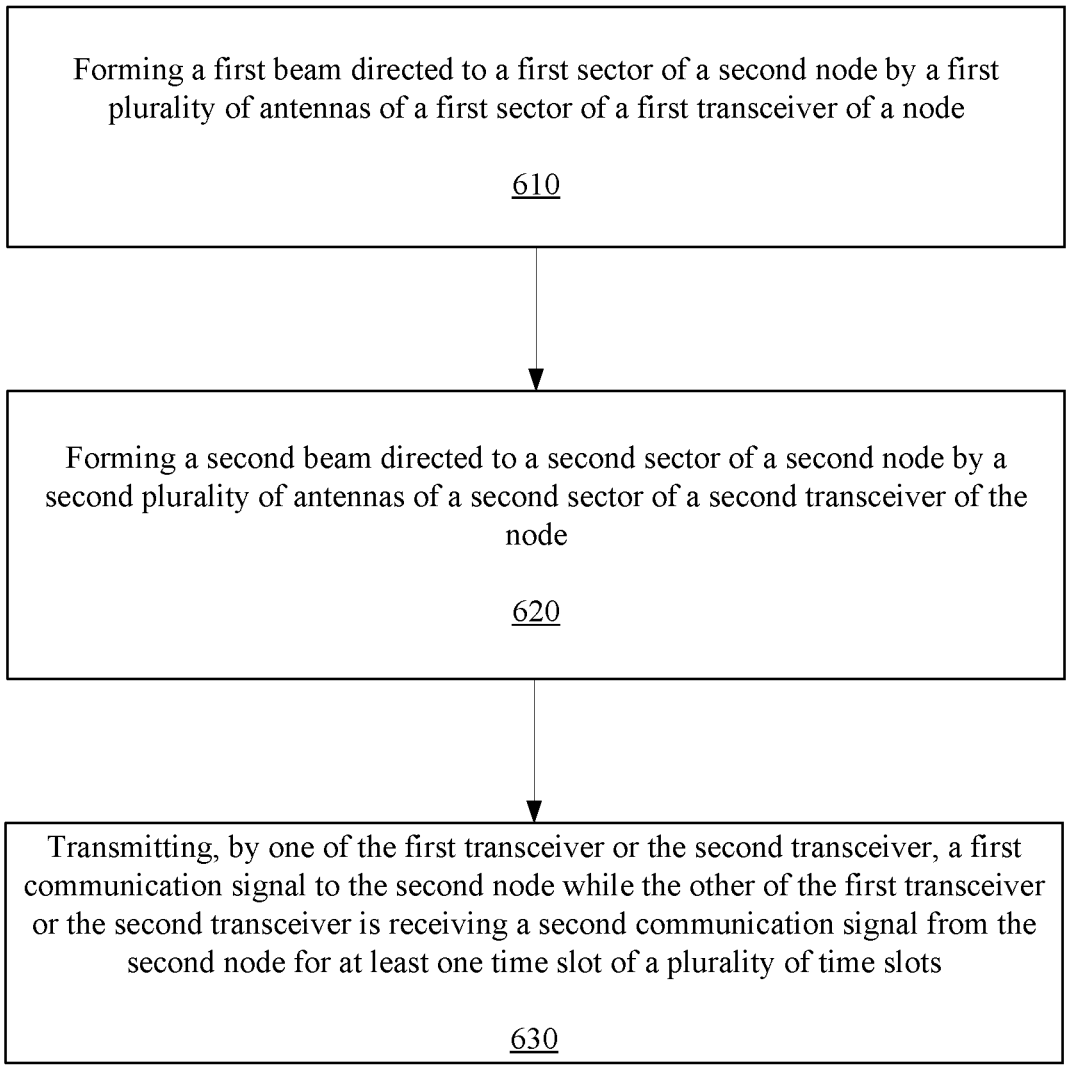
FIG. 6 is a flow chart that includes steps of a method of a simultaneous bidirectional wireless link, according to an embodiment.

FIG. 6 is a flow chart that includes steps of a method of a simultaneous bidirectional wireless link, according to an embodiment. A first step 610 includes forming a first beam directed to a first sector of a second node by a first plurality of antennas of a first sector of a first transceiver of a node. A second step 620 includes forming a second beam directed to a second sector of a second node by a second plurality of antennas of a second sector of a second transceiver of the node. A third step 630 includes transmitting, by one of the first transceiver or the second transceiver, a first communication signal to the second node while the other of the first transceiver or the second transceiver is receiving a second communication signal from the second node for at least one time slot of a plurality of time slots.

As previously described, for an embodiment, for at least one time slot of the plurality of time slots, the first transceiver transmits a communication signal to the second node while the second transceiver receives a communication signal from the second node, and for at least one other time slot of the plurality of time slots the first transceiver receives a communication signal from the second node while the second transceiver transmits a communication signal to the second node.

As previously described, for an embodiment, the scheduling of the transmission of the first communication signal is synchronized with scheduling of the reception of the second communication signal.

As previously described, for an embodiment, RF (radio frequency) isolation between the first sector and the second sector is greater than a threshold.

As previously described, for an embodiment, a simultaneous bidirectional wireless link is formed between the node and the second node by the one of the first transceiver or the second transceiver transmitting a first communication signal to the second node while the other of the first transceiver or the second transceiver is receiving a second communication signal from the second node.

As previously described, for an embodiment, selecting between the simultaneous bidirectional wireless link formed between the node and the second node or communication between the node and a third node includes forming the simultaneous bidirectional wireless link between the node and the second node for a first period of time, and establishing a second link between the node and the third node for a second period of time. As previously described, for an embodiment, establishing the second link between the node and the third node includes for at least one time slot of a plurality of time slots of the second period of time, one of the first transceiver or the second transceiver transmitting a third communication signal to the third node while the other of the first transceiver or the second transceiver is receiving a fourth communication signal from the third node.

Further, as previously described, for an embodiment, selecting between the simultaneous bidirectional wireless link between the node and the second node or a non-simultaneous bidirectional wireless link between the node and the second node includes forming the simultaneous bidirectional wireless link between the node and the second node for a first period of time, and forming the non-simultaneous bidirectional wireless link between the node and the second node for a second period of time.

As previously described, for an embodiment, selecting between the simultaneous bidirectional wireless link between the node and the second node or the non-simultaneous bidirectional wireless link between the node and the second node includes determining a throughput load of the first node or the second node, and forming the simultaneous bidirectional wireless link if the throughput load is greater than a threshold, and forming the non-simultaneous bidirectional wireless link if the throughput is less than a threshold. For an embodiment, formation of the non-simultaneous bidirectional wireless link comprises one or more of the first transceiver and the second transceiver transmitting the communication directed to one or more receivers of the second node.

As previously described, for an embodiment, selecting between the simultaneous bidirectional wireless link between the node and the second node or the non-simultaneous bidirectional wireless link between the node and the second node includes determining a link quality between the first node and the second node, and forming the simultaneous bidirectional wireless link if the link quality is greater than a threshold, and forming the non-simultaneous bidirectional wireless link if the link quality is less than a threshold. For an embodiment, formation of the non-simultaneous bidirectional wireless link comprises one or more of the first transceiver and the second transceiver transmitting the communication directed to one or more receivers of the second node.

As previously stated, for an embodiment, formation of the non-simultaneous wireless link includes one or more of the first transceiver and the second transceiver forming one or more directional beams and transmitting the communication directed to one or more receivers of the second node. For at least some embodiments, the formation of the non-simultaneous bidirectional link includes transmission diversity in which multiple beams are formed by the node and directed during transmission to multiple sectors of second node. For at least some embodiments, the formation of the non-simultaneous bidirectional link includes transmission diversity in which a single beam is formed by the node and directed during transmission to multiple sectors of second node. For at least some embodiments, the formation of the non-simultaneous bidirectional link includes reception diversity in which multiple beams are formed by the second node and directed during reception to single sectors of second node. For at least some embodiments, the formation of the non-simultaneous bidirectional link includes reception diversity in which a single beam is formed by the second node and directed during reception to multiple sectors of node.

Node Characterization

Figure 7:
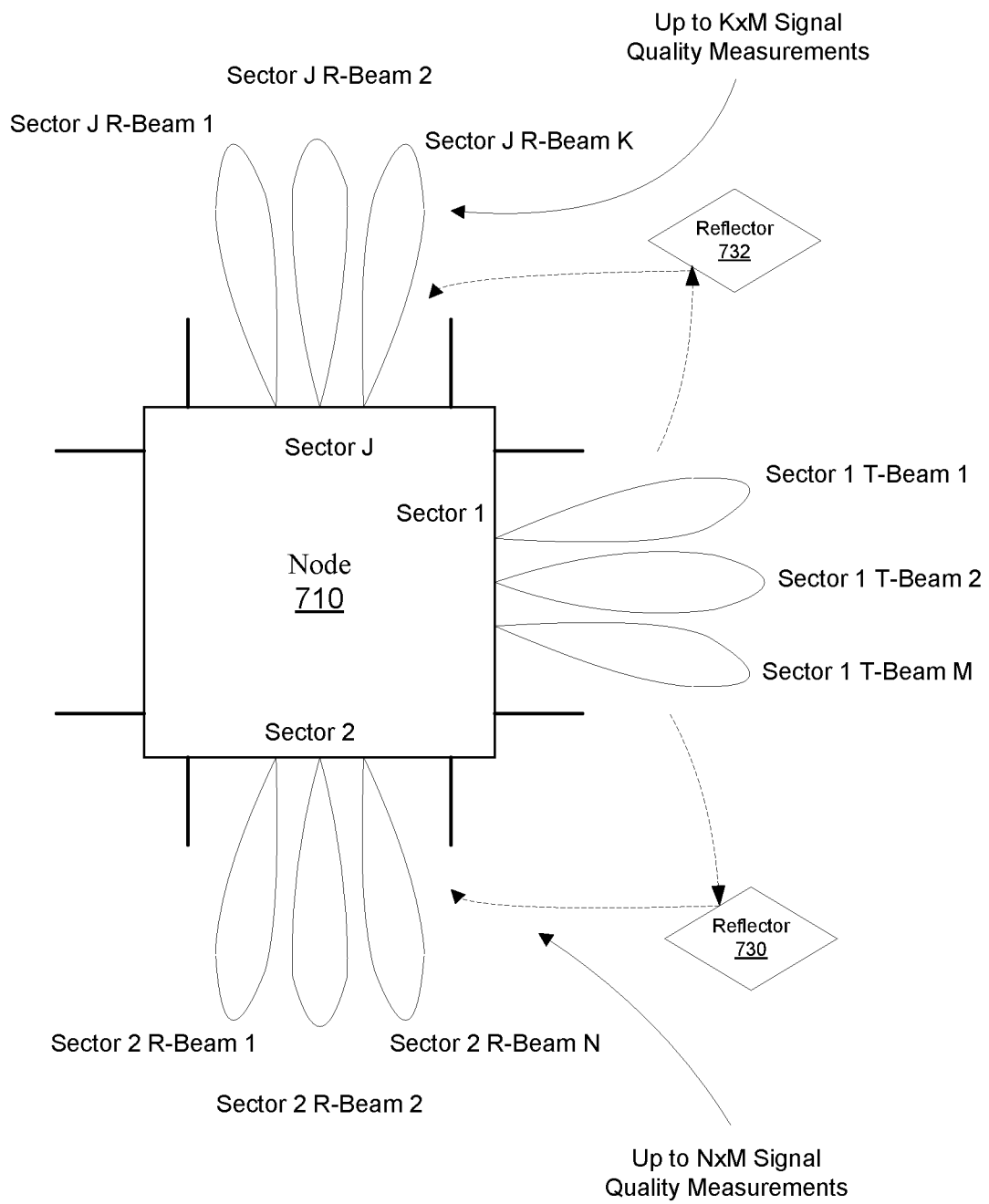
FIG. 7 shows a node that includes self-calibration, according to an embodiment.

As previously described, for at least some embodiments, one or more interference cancellation signals are controlled based on received signal power measurements of a self-calibration by the node (for example, the first node 110) of cross coupling (interference) between the first sector and the second sector. FIG. 7 shows a node 710 that includes self-calibration, according to an embodiment. While the sectors (Sector 1 and Sector 2) of the node 710 of FIG. 7 are oriented differently relative to each other as the node 110 of FIG. 1, the effect of cross coupling between the sectors is similar, and the same processes for mitigating cross coupling can be utilized. The node 710 includes a first sector (sector 1) that includes an antenna array. The array of antennas of the first sector of the node 110 is operable to form a beam. For at least some embodiments, the array of antennas of the first second includes M beam forming settings that direct the beam formed by the antenna array of the first sector to M different directions.

As shown, the node 710 can includes J sectors, including at least the first sector (sector 1) and a second sector (sector 2). Further, the second sector of the node 110 includes an antenna array which includes N settings that direct the beam formed by the antenna array of the second sector to N different directions.

As shown, Jth sector of the node 710 includes an antenna array which includes K settings that direct the beam formed by the antenna array of the Jth sector to K different directions.

Ideally, the sectors of the node are isolated from each other so that when the first sector is transmitting a signal through a transmission channel through one of the M beam settings, none (or very little) of the transmit signal of the first sector directly couples over to the second sector (or other sectors) while the second sector is receiving a signal through the transmission channel through one of the N beam settings. However, even if the first sector is perfectly isolated from the second sector, typically at least a portion of the transmission signal from the first sector is received by the second sector due to, for example, reflections of the transmission signal caused by reflectors 730, 732, leakage, and other coupling effects. That is, in the real-world, the beams that are formed are not perfectly directed to a target (for example, a receiving peer node), and obstacles exist that impede and at least partially redirect a portion of the transmission signal. Accordingly, at least a portion of the transmission signal is typically received by the second sector when the antenna array of the second sector is receiving a signal from another peer device or node. How much of the signal transmitted by the first sector and received by the second sector is dependent upon the environment the node is in, and how many reflectors are within the environment.

When the node 710 is transmitting from one sector, at least some of that transmission signal typically is received by a different sector (such as, the second sector) while the different sector is receiving a signal from another device or peer node. Based on the uncontrolled real-world environment in which the nodes are deployed, due to real-world reflectors (such as, reflectors 730, 732) and other forms of leakage, varying amounts of transmit signals of the first sector are received by the second sector for the different M directions of the beam formed by the array of antennas of the first sector, and for the different N directions of the beam formed by the array of antennas of the second sector.

Due to the varying real-world nature in which transmission signals of the first sector are coupled back to the second sector, transmission signals of different combinations of the M directions of the beam formed by the array of antennas of the first sector can be coupled (for example, due to reflections or leakage) differently for each of the N directions of the beam formed by array of antennas of the second sector. At least some embodiments of node 710 are operative to characterize itself by measuring a signal quality received at the second sector for a plurality of the M settings of the beam directions of the array of antennas of the second sector, while transmitting a signal at each of a plurality of the N setting of the beam directions of the array of antennas of the first sector. That is as many as N×M signal quality measurements are made at the second sector. These signal quality measurements provide a representation of the amount of transmit signal of the first sector that is received by the second sector for each of the transmit beam forming and receive beam forming settings of the first and second sectors. That is, the received signal quality measurements provide a representation of the interference at a receiving sector of the node 710 due to transmission of signals from a transmitting sector of the node 710.

For at least some embodiments, measuring the received signal quality includes measuring one or more of RSSI (received signal strength indicator), SINR (signal to interference and noise ratio), SIR (signal to interference ratio), CIR (channel impulse response), SNR (signal to noise ratio), a PER (packet error rate), BER (bit error rate), or throughput. For at least some embodiments, the received signal quality is measured by the transceiver that corresponds with the sector (for example, the second sector) of the node that is receiving the signal transmitted by the other sector (for example, first sector).

Each the J different sectors can similarly measure a receive signal quality at a plurality of receive beam forming settings while the first sector is transmitting over a plurality of transmit beam forming settings, thereby efficiently characterizing other sectors the node at the same time the second sector is being characterized.

For at least some embodiments, reciprocity of the transmission channel between the first sector and the second sector is assumed. That is, transmission signals from the second sector that are received at the first sector are assumed to approximately the same as transmission signals from the first sector that are received at the second sector. Accordingly, one or more of the receive signal quality measurements made at the second sector can be equally applied at the first sector.

FIG. 8 shows a table of an example node that includes sector beam forming settings, and received signal qualities, according to an embodiment. The first and second columns of the table list possible sector 1 beam settings and sector 2 beam settings. For an embodiment, during characterization of the node, the first sector (sector 1) is transmitting while the second sector (sector 2) is receiving. As shown, there are M possible transmit beam settings of the first sector. For a plurality of the M possible transmit beam settings of the first sector (sector 1) receive signal quality measurements are made for a plurality of the N possible receive beam settings of the second sector (sector 2). While there are N×M possible receive signal quality measurements, at least some embodiments include receive signal quality measurements at only a subset of the N×M possible measurements, which saves time and processing.

For an embodiment, at least a subset of the M transmit beam forming settings is used during characterization. For an embodiment, the subset is selected based on the existence of peer nodes (such as, second node 120) with which the node can communicate. For example, while M transmit beam settings of the first sector may be possible, only a subset of the M transmit beam setting actually enable the formation of a micro-route with a peer node (such as, second node 120). Therefore, only the subset of the M transmit beam forming settings need be characterized. For example, as shown in the Table of FIG. 8, no peer node pairs correspond with the sector 1 transmit beam forming setting of M, and therefore, no receive signal quality measurements are made for the transmit beam forming setting M of the first sector. For an embodiment, a determination of new or different peer nodes may be used to trigger a re-characterization of the node.

Further, for an embodiment, at least a subset of the N transmit beam forming settings is used during characterization. For an embodiment, the subset is selected based on the existence of peer nodes (such as, second node 120) with which the node can communicate. For example, while N receive beam settings of the first sector may be possible, only a subset of the N receive beam setting actually enable the formation of a micro-route with a peer node. Therefore, only the subset of the N receive beam forming settings need be characterized. For an embodiment, a determination of new or different peer nodes may be used to trigger a re-characterization of the node.

For an embodiment, prior communication with peer nodes is used to determine whether a particular transmit beam forming setting or receive beam forming setting is included within the characterization of the node. For example, some communication can be determined to be so good (greater than a threshold) that re-characterization of the particular transmit beam forming setting or receive beam forming setting is not needed. That is, the signal quality of such communication is so good (greater than a signal quality threshold) that a re-characterization is not need. The same premise can hold for poor communication. That is, communication with a peer node or set of peer node is so bad (less than a signal quality threshold) that it is a waste of resources to even bother to characterize the particular transmit or receive beam forming settings.

The transmit beam setting (1) of the first sector may correspond with (that is, the selected beam direction forms a micro-route with) a peer node P1. That is, a micro-route is established between the node (such as, node 110) and the peer node P1 (such as, the second node 120) when the transmit beam setting (1) is selected, and the node is able to transmit (or receive) communication to the peer node P1. For at least some embodiments, a micro-route between the node and a peer node includes a line-of-sight (LOS) link. For at least some embodiments, the micro-route includes an indirect reflective link, wherein a reflector causes the micro-route to be indirect due to the reflective path of the propagation of electromagnetic signals through the micro-route. Further, selecting the receive beam setting 1 of the second sector may correspond with (that is, the selected beam direction forms a micro-route with) a peer node P2. That is, a micro-route is established between the node and the peer node P2 when the receive beam setting (1) is selected, and the node receives communication from the peer node P2.

As previously noted, while the table of FIG. 8 suggest M transmit beam settings and N receive beam settings, control of the node can adaptively determine which transmit and receive beam form setting are to be used for measuring the receive signal quality. Accordingly, the number of beam forming settings, and the number of receive signal quality measurement can be adaptively adjusted.

For an embodiment, communication signal quality measurements are performed during communications (transmission and/or reception) with the peer nodes. These communication signal quality measurements can be used for selectively determining which of the transmit beam settings and receive beam settings are to be used during the signal quality measurements of the node. Further, the communication signal quality measurements can be used to adaptively determine when to characterize the node. For example, for an embodiment, if the signal quality of signals transmitted from or received at the node are varying greater than a threshold, then the node can be triggered to re-characterize itself because it is assumed that the environment around the node is changing enough that operation of the node would benefit from a re-characterization.

For an embodiment, the re-characterization of the node occurs periodically. For an embodiment, the re-characterization of the node occurs dynamically. For an embodiment, the dynamic re-characterization occurs dynamically based upon sensed changes in the environment surrounding the node. For an embodiment, the sensed change of the environment is determined by the transmit and receive signal qualities of communication signal with peer nodes being sensed to change greater than a threshold amount.

Columns 3, 4 and 5 of the table of FIG. 8 show signal quality measurements at different times. Each of the signal quality measurements correspond with a transmit beam forming setting (of the first sector) and a receive beam forming setting (or the second sector). As previously described, there can be multiple transmit beam forming settings and/or multiple receive beam forming setting between the first node 110 and the second node 120. At least some embodiments include selecting the transmit beam forming settings and/or the receive beam forming setting between the first node 110 and the second node 120, wherein the selection is based on the measure received signal quality measurements that correspond with each of the transmit beam forming settings and/or the receive beam forming setting between the first node 110 and the second node 120. For an embodiment, the selection is made to reduce or minimize the cross coupling between the first sector and the second sector of the first node.

For at least some embodiments, monitoring of the signal quality measurements at different times can be used for determining how frequently or at what times the signal quality measurement should or should not be made. For example, if the node is in a static environment then the signal quality measurement may not be needed very often. If the node is in a dynamic environment, then the signal quality measurements may need to be made more frequently. Further, the time of day, week, month or year may further influence when the signal quality measurements should be made. That is, during a certain time of each day during the week, the environment of the node may be dynamic, but during other times the environment of the node may be relatively static. An embodiment includes performing new signal quality measurements for the transmit and the receive beam settings when changes to the environment of the node are determined to exceed a threshold (for example, wherein the signal quality of signals transmitted from or received at the node are varying greater than a threshold). Note that this can apply to particular transmit and receive beam settings. That is, the only a subset of the transmit and/or receive beam settings may exceed the threshold, and therefore, only a subset of the transmit and/or receive beam setting may need to be re-characterized (re-measured).

For at least some embodiments, prior receive signal quality measurements influence whether receive signal quality measurements of future characterization of the node of each of the different transmit and receive beam settings are made. The receive signal quality measurements at times T1, T2 and T3 can be used to determine whether later receive signal quality measurement should or should not be made. For example, the receive signal quality measurements for the sector 1 transmit beam setting of 1 and the sector 2 receive beam forming setting is different for each of the receive signal quality measurements and T1, T2, T3. This would suggest that the later characterization of the node should include this setting. In contrast, the receive signal quality measurements for the sector 1 transmit beam setting of 2 and the sector 2 receive beam forming setting is same for each of the receive signal quality measurements and T1, T2, T3. This would suggest that the later characterization of the node may not need to include this setting because the environment about the peer nodes that correspond with this setting is relatively static. Accordingly, for an embodiment, characterizations of the node are performed upon determining that variations of the received signal quality measurements over a plurality of measurements are greater than a threshold.

For an embodiment, the node is operative to select a transmit beam forming setting and a receive beam forming setting between the node and the second node, wherein the selection is based on the measure received signal quality measurements that correspond with each of the transmit beam forming settings and the receive beam forming setting between the node and the second node. That is, for example, the node 110 selects the beam forming settings of the antennas 112 of the first sector and the beam forming settings of the antennas 114 of the second sector based at least in part on the measure received signal quality measurements that correspond with each of the transmit beam forming settings and the receive beam forming setting between the node and the second node. For example, the beam forming settings may be selected only if the measure received signal quality measurements corresponding with the transmit beam forming settings and the receive beam forming setting are greater than a signal quality threshold.

Interference Cancellation Signals Controlled by Node Characterization

As previously stated, for at least some embodiments, cross interference between the communication of the first sector of the first node 110 and the second sector of the first node 110 is mitigated by generating interference cancellation signals. That is, as previously stated, for at least some embodiments, the one or more interference cancellation signals are controlled based on received signal power measurements of a self-calibration by the node (first node 110) of cross coupling (interference) between, for example, the first sector and the second sector.

Figure 9:
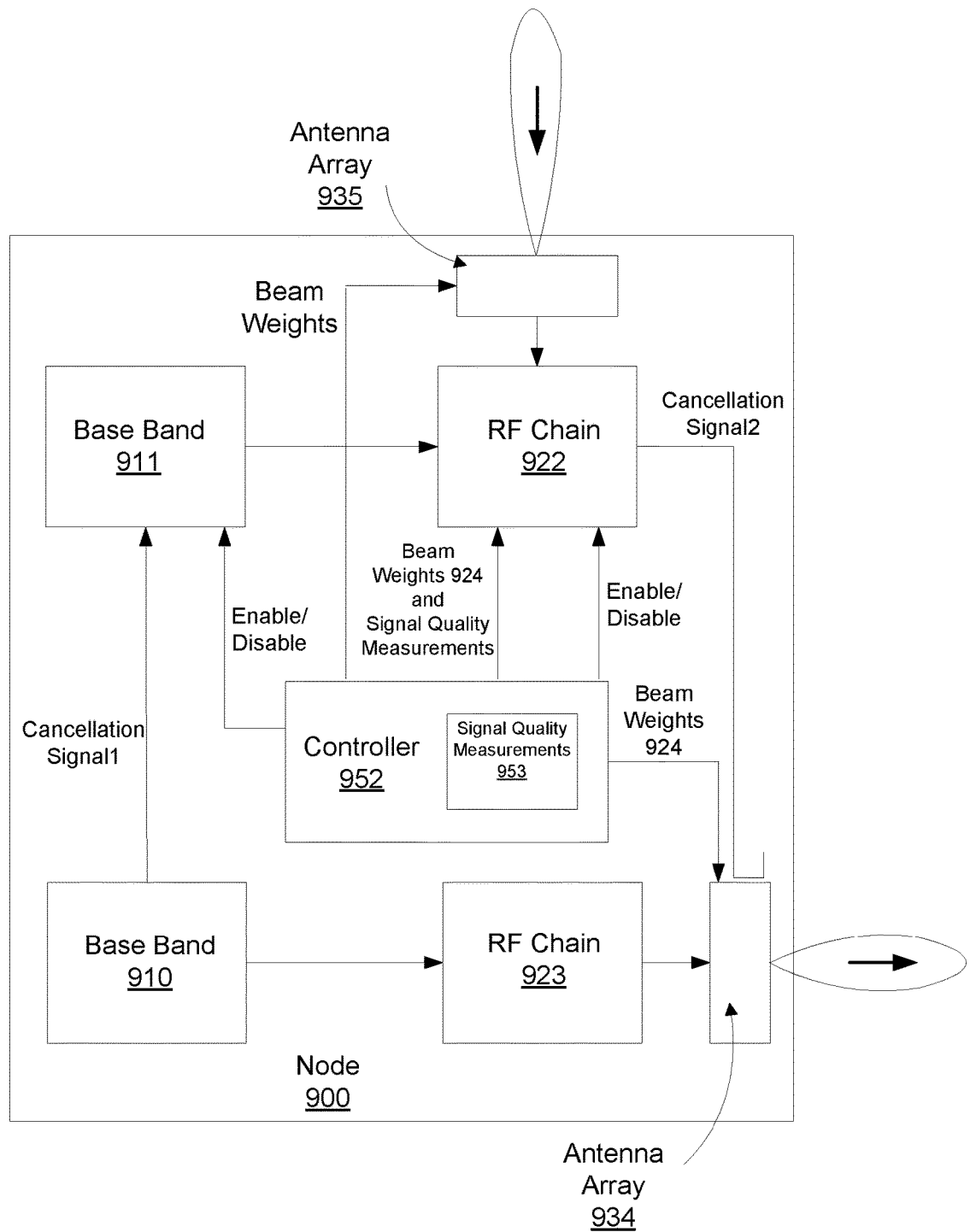
FIG. 9 is a block diagram of a node that includes interference cancellation signals, according to an embodiment.

FIG. 9 is a block diagram of a node 900 that includes interference cancellation signals, according to an embodiment. As shown, at least some embodiments include generating an interference cancellation signal (such as, interference cancellation signal 1 or interference cancellation signal 2) for at least one of pairs of transmit beam forming settings and receive beam forming settings (that is, beam forming settings of, for example, the first plurality of antennas 112, and the second plurality of antennas 114), filtering the interference cancellation signal based on signal quality for a given pair of transmit and receive beam settings, and summing the filtered interference cancellation signal with a signal received while the node is simultaneously communicating with the second node 120 with the transmit beam forming setting and receive beam forming setting.

As shown, the node 900 includes a first sector that includes baseband processing 910, RF (radio frequency) chain 923, and an antenna array 934. The node 900 further includes a second sector that includes baseband processing 911, RF (radio frequency) chain 922, and an antenna array 935. For an embodiment, one or more interference cancellation signals (interference cancellation signal 1 and/or interference cancellation signal 2) are generated to at least partially cancel signals transmitted from the first sector that are coupled back into received signals of the second sector. That is, the interference cancellation signals are generated based on the transmit signal of the first sector at either the baseband processing 910 (for the cancellation signal 1), or at least one of the antenna array 934, or at the output of RF chain 923 (for the cancellation signal 2). The interference cancellation signals are filtered and summed by the second sector of at least at one of the baseband processing 911 (for the cancellation signal 1) or at the RF chain 922.

For at least some embodiments, a controller 952 of the node generates one or more enable control signals (Enable/Disable) that enable or disable the interference cancellation signals (interference cancellation signal 1 and/or interference cancellation signal 2) based on received signal quality measurements 953 determined during a characterization of the node 900. Further, for at least some embodiments, the received signal quality measurements include a channel impulse response, and the controller further aids the interference cancellation signals based on the channel impulse response. Received signal quality measurement for a given transmit beam weight 924 applied to antenna array 934, and a receive beam weight applied to antenna array 935, are available at the Baseband 911 and RF chain 922.

Although specific embodiments have been described and illustrated, the embodiments are not to be limited to the specific forms or arrangements of parts so described and illustrated. The described embodiments are to only be limited by the claims.

What is claimed:

1. A node, comprising:
a first sector comprising a first transceiver and a first plurality of antennas, the first plurality of antennas operative to form a beam directed to a first sector of a second node;
a second sector comprising a second transceiver and a second plurality of antennas, the second plurality of antennas operative to form a beam directed to a second sector of the second node, wherein the second plurality antennas are spatially separate from the first plurality of antennas; and wherein for at least one time slot of a plurality of time slots, one of the first transceiver or the second transceiver transmits a first communication signal to the second node while the other of the first transceiver or the second transceiver receives a second communication signal from the second node, wherein the first communication signal propagates through a channel from the first plurality of antennas of the first sector of the node and the second sector of the second node over at least a same set of frequencies that the second communication signal propagates through a spatially separate channel from the second node to the second plurality of antennas of the second sector of the node:
wherein the node is further operative to:
generate an interference cancellation signal based on a self-characterization of the node, and the based on the first communication signal; and
sum the interference cancellation signal with the received second communication signal while the simultaneous bidirectional wireless link is formed between the node and the second node.

2. The node of claim 1, wherein for at least one time slot of the plurality of time slots, the first transceiver transmits a communication signal to the second node while the second transceiver receives a communication signal from the second node, and for at least one other time slot of the plurality of time slots the first transceiver receives a communication signal from the second node while the second transceiver transmits a communication signal to the second node.

3. The node of claim 1, wherein time slots of transmission of the first communication signal are synchronized with time slots of reception of the second communication signal.

4. The node of claim 1, wherein a simultaneous bidirectional wireless link is formed between the node and the second node by the one of the first transceiver or the second transceiver transmitting a first communication signal to the second node while the other of the first transceiver or the second transceiver is receiving a second communication signal from the second node.

5. The node of claim 4, wherein the node is further operative to select between the simultaneous bidirectional wireless link formed between the node and the second node or communication between the node and a third node, comprising:
the node operative to form the simultaneous bidirectional wireless link between the node and the second node for a first period of time; and
the node operative to establish a second link between the node and the third node for a second period of time.

6. The node of claim 5, wherein establishing the second link between the node and the third node comprises:
for at least one time slot of a plurality of time slots of the second period of time, one of the first transceiver or the second transceiver transmitting a third communication signal to the third node while the other of the first transceiver or the second transceiver is receiving a fourth communication signal from the third node.

7. The node of claim 4, wherein the node is further operative to select between the simultaneous bidirectional wireless link between the node and the second node or a non-simultaneous bidirectional wireless link between the node and the second node, comprising:
the node operative to form the simultaneous bidirectional wireless link between the node and the second node for a first period of time; and
the node operative to form the non-simultaneous bidirectional wireless link between the node and the second node for a second period of time.

8. The node of claim 7, wherein the node operative to select between forming the simultaneous bidirectional wireless link between the node and the second node, or forming the non-simultaneous bidirectional wireless link between the node and the second node comprises:
determining a throughput load of the first node or the second node; and
forming the simultaneous bidirectional wireless link if the throughput load is greater than a threshold, and forming the non-simultaneous bidirectional wireless link if the throughput is less than a threshold;
wherein formation of the non-simultaneous bidirectional wireless link comprises one or more of the first transceiver and the second transceiver forming one or more directional beams and transmitting communication signals directed to one or more receivers of the second node.

9. The node of claim 8, wherein node forms a plurality of directional beams directed to a plurality of transceivers of the second node.

10. The node of claim 8, wherein node forms a single directional beam directed to a plurality of transceivers of the second node.

11. The node of claim 7, wherein the node operative to select between forming the simultaneous bidirectional wireless link between the node and the second node, or forming the non-simultaneous bidirectional wireless link between the node and the second node comprises:
determining a link quality between the first node and the second node; and
forming the simultaneous bidirectional wireless link if the link quality is greater than a threshold, and forming the non-simultaneous bidirectional wireless link if the link quality is less than a threshold;
wherein formation of the non-simultaneous bidirectional wireless link comprises one or more of the first transceiver and the second transceiver transmitting communication signals directed to one or more receivers of the second node.

12. The node of claim 1, wherein the node is further operative to:
self-characterize itself comprising the node operative to:
transmit a signal through a predetermined transmission channel at each of a first plurality of transmit beam forming settings of the first plurality of antennas;
receive the signal through the predetermined channel at a second plurality of receive beam forming settings of the second plurality of antennas, for each of more than one of the first plurality of transmit beam forming settings of the first plurality of antennas;
measure a received signal quality of the received signal at each of the second plurality of receive beam forming settings of the second plurality of antennas, for each of the more than one of the first plurality of transmit beam forming settings of the first plurality of antennas; wherein the node is further operative to:
generate the interference cancellation signal for at least one of pairs of transmit beam forming settings and receive beam forming settings based at least in part on characterized received signal qualities of the self-characterization of the node.

13. The node of claim 1, wherein the node is further operative to:
self-characterize itself comprising the node operative to:

transmit a signal through a predetermined transmission channel at each of a first plurality of transmit beam forming settings of the first plurality of antennas;

receive the signal through the predetermined channel at a second plurality of receive beam forming settings of the second plurality of antennas, for each of more than one of the first plurality of transmit beam forming settings of the first plurality of antennas;

measure a received signal quality of the received signal at each of the second plurality of receive beam forming settings of the second plurality of antennas, for each of the more than one of the first plurality of transmit beam forming settings of the first plurality of antennas; wherein the node is further operative to:

select a transmit beam forming setting and a receive beam forming setting between the node and the second node, wherein the selection is based on the measure received signal quality measurements that correspond with each of the transmit beam forming settings and the receive beam forming setting between the node and the second node.

14. A method, comprising:

forming a first beam directed to a first sector of a second node by a first plurality of antennas of a first sector of a first transceiver of a node;

forming a second beam directed to a second sector of a second node by a second plurality of antennas of a second sector of a second transceiver of the node, wherein the second plurality antennas are spatially separate from the first plurality of antennas;

wherein for at least one time slot of a plurality of time slots, transmitting, by one of the first transceiver or the second transceiver, a first communication signal to the second node while the other of the first transceiver or the second transceiver is receiving a second communication signal from the second node, wherein the first communication signal propagates through a channel from the first plurality of antennas of the first sector of the node and the second sector of the second node over at least a same set of frequencies that the second communication signal propagates through a spatially separate channel from the second node to the second plurality of antennas of the second sector of the node;

the method further comprising:

generating an interference cancellation signal based on a self-characterization of the node, and the based on the first communication signal; and summing the interference cancellation signal with the received second communication signal while the simultaneous bidirectional wireless link is formed between the node and the second node.

15. The method of claim 14, wherein for at least one time slot of the plurality of time slots, the first transceiver transmits a communication signal to the second node while the second transceiver receives a communication signal from the second node, and for at least one other time slot of the plurality of time slots the first transceiver receives a communication signal from the second node while the second transceiver transmits a communication signal to the second node.

16. The method of claim 14, wherein a simultaneous bidirectional wireless link is formed between the node and the second node by the one of the first transceiver or the second transceiver transmitting a first communication signal to the second node while the other of the first transceiver or the second transceiver is receiving a second communication signal from the second node.

17. The method of claim 16, further comprising selecting between the simultaneous bidirectional wireless link formed between the node and the second node or communication between the node and a third node, comprising:

forming the simultaneous bidirectional wireless link between the node and the second node for a first period of time; and establishing a second link between the node and the third node for a second period of time.

18. The method of claim 17, wherein establishing the second link between the node and the third node comprises:

for at least one time slot of a plurality of time slots of the second period of time, one of the first transceiver or the second transceiver transmitting a third communication signal to the third node while the other of the first transceiver or the second transceiver is receiving a fourth communication signal from the third node.

19. The method of claim 16, further comprising selecting between the simultaneous bidirectional wireless link between the node and the second node or a non-simultaneous bidirectional wireless link between the node and the second node, comprising:

forming the simultaneous bidirectional wireless link between the node and the second node for a first period of time; and forming the non-simultaneous bidirectional wireless link between the node and the second node for a second period of time.

20. The method of claim 19, wherein selecting between forming the simultaneous bidirectional wireless link between the node and the second node, or forming the non-simultaneous bidirectional wireless link between the node and the second node comprises:

determining a throughput load of the first node or the second node; and forming the simultaneous bidirectional wireless link if the throughput load is greater than a threshold, and forming the non-simultaneous bidirectional wireless link if the throughput load is less than a threshold;

wherein formation of the non-simultaneous bidirectional wireless link comprises one or more of the first transceiver and the second transceiver transmitting communication signals directed to one or more receivers of the second node.

* * * * *